(12) United States Patent
Kuo

(10) Patent No.: US 6,349,580 B1
(45) Date of Patent: Feb. 26, 2002

(54) LOCK FOR A STEERING WHEEL OF A VEHICLE

(76) Inventor: Fu-Sheng Kuo, No. 16, Lane 459, Sec. 1, An Ho Rd., Tainan (TW)

( * ) Notice: Subject to any disclaimer, the term of this patent is extended or adjusted under 35 U.S.C. 154(b) by 0 days.

(21) Appl. No.: 09/631,539

(22) Filed: Aug. 3, 2000

(51) Int. Cl.$^7$ ............................................. B60R 25/02
(52) U.S. Cl. ......................................... 70/209; 70/237
(58) Field of Search ........................... 70/209, 211, 212, 70/225, 226, 237, 238

(56) References Cited

U.S. PATENT DOCUMENTS

| | | | | |
|---|---|---|---|---|
| 5,168,732 A | * | 12/1992 | Chen et al. | 70/209 |
| 5,375,441 A | * | 12/1994 | Liou | 70/209 |
| 5,428,976 A | * | 7/1995 | Weng et al. | 70/209 |
| 5,440,908 A | * | 8/1995 | Lin | 70/226 X |
| 5,452,597 A | * | 9/1995 | Chen | 70/226 X |
| 5,595,077 A | * | 1/1997 | Weng et al. | 70/226 X |
| 5,609,050 A | * | 3/1997 | Yu | 70/209 |
| 5,636,537 A | * | 6/1997 | Chen | 70/209 |
| 5,671,619 A | * | 9/1997 | Hou | 70/209 |
| 5,718,133 A | * | 2/1998 | Chen et al. | 70/209 |
| 5,970,758 A | * | 10/1999 | Chen | 70/209 |

* cited by examiner

*Primary Examiner*—Lloyd A. Gall
(74) *Attorney, Agent, or Firm*—Thorp Reed & Armstrong LLP

(57) ABSTRACT

A lock for a steering wheel of a vehicle includes a body and a catch, wherein the body consists of a holding portion, a lock core and a rod, the catch is slidingly mounted around the rod, a retaining plate of the catch is extendable into a locking groove defined in the holding portion corresponding to the retaining plate, a lock block of the lock core is extendable into a lock hole defined in the retaining plate of the catch corresponding to the lock block to retain the catch in a lock mode. When a steering wheel is fitted in the holding portion and obstructed by the retaining plate which is inserted into the locking groove and locked therein, the rod is pressed against an interior part of the vehicle, thereby the steering wheel is retained in a non-rotatable position.

5 Claims, 5 Drawing Sheets

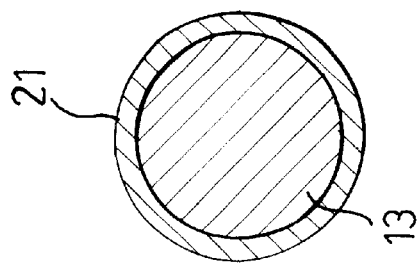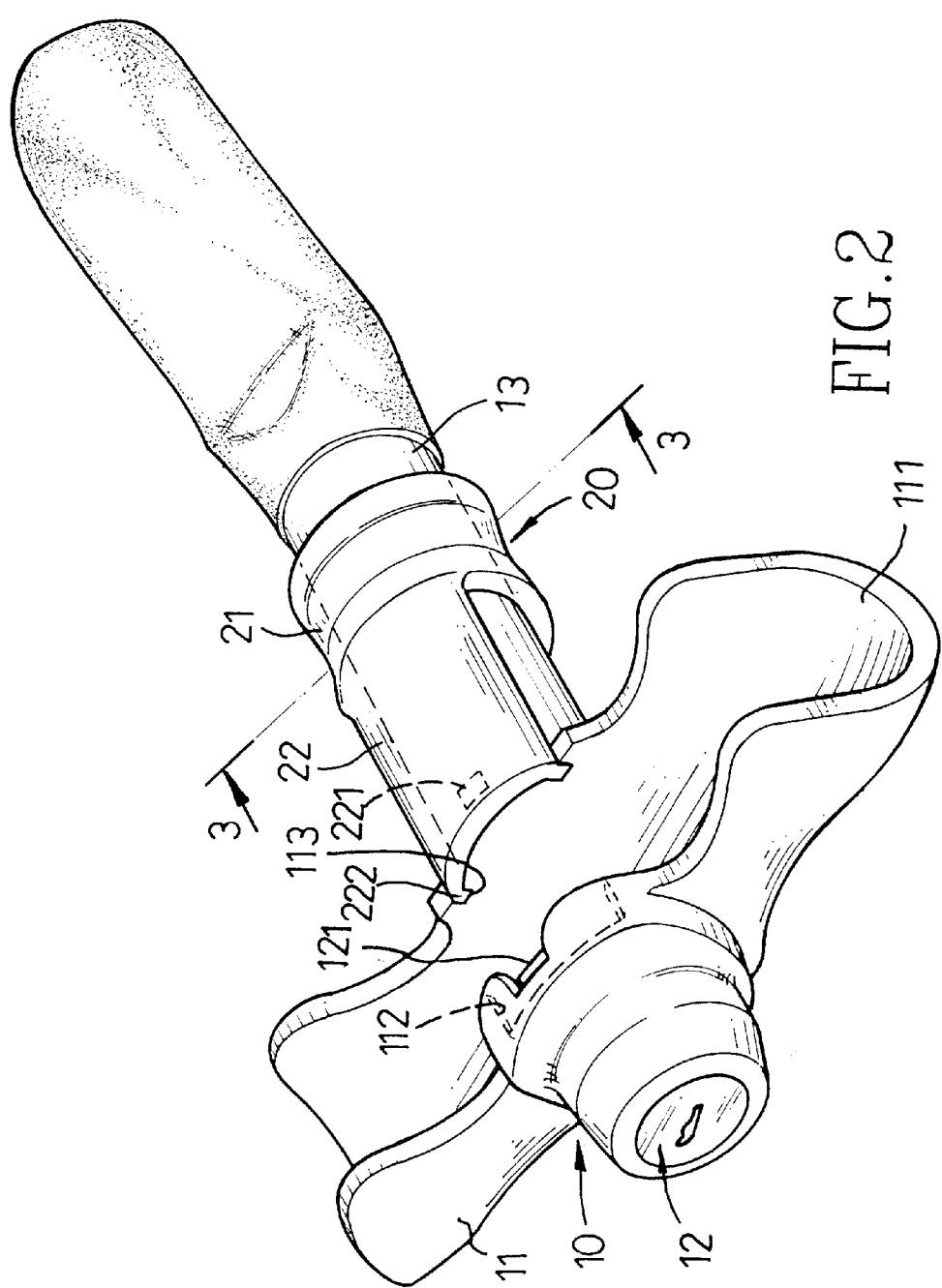

LOCK FOR A STEERING WHEEL OF A VEHICLE

BACKGROUND OF THE INVENTION

1. Field of the Invention

The present invention relates to a lock for securing a steering wheel of a vehicle to prevent the steering wheel from being rotated by any unauthorized person, so as to guard against theft of the vehicle.

2. Description of Related Art

How to prevent vehicles, such as cars and trucks etc., from being stolen has become a major problem all over the world. Today there are various kind of theft-proof devices sold on the market, for example locks to prevent unauthorized entry of vehicle, alarm systems to indicate that a vehicle has been at least tampered with, and steering wheel locks to prevent driving away of the vehicle if a thief manages to overcome the first two devices.

The conventional steering wheel lock normally has two types: a first type normally comprises a slide retaining catch; a second type normally comprises a turning retaining catch. However, these two types of conventional steering wheel locks all have an important defect that the lock catches thereof are not solid enough to guard against destruction caused by a thief. Another defect of the conventional steering wheel lock is that the structure thereof is too complex, so that the production cost is too high.

Therefore, it is an objective of the invention to provide a steering wheel lock to mitigate and/or obviate the aforementioned problems.

SUMMARY OF THE INVENTION

The object of the present invention is to provide a lock for a steering wheel of a vehicle, the structure of the lock is simple and solid. The lock comprises a body and a catch, wherein the body consists of a holding portion, a lock core fixed in an outer face of an upright first wall of the holding portion and a rod having one end thereof secured on an outer face of an upright second wall of the holding portion, the rod extends substantially perpendicular to the holding portion, the catch is slidingly mounted around the rod between an engaging position with the lock core, and a releasing position away from the lock core. When the steering wheel's rim is fitted in the holding portion and obstructed between the holding portion and the catch, and the rod is pressed against an interior part of the vehicle, the steering wheel is retained by the lock in a non-rotatable position.

The detailed features of the present invention will be apparent in the detailed description with appropriate reference to the accompanying drawings.

BRIEF DESCRIPTION OF THE DRAWINGS

FIG. 2 is a perspective view of the lock in accordance with the present invention;

FIG. 3 is a cross sectional view of the lock in accordance with the present invention, along a line 3—3 in FIG. 2;

DETAILED DESCRIPTION OF THE PREFERRED EMBODIMENT

Figure 1:
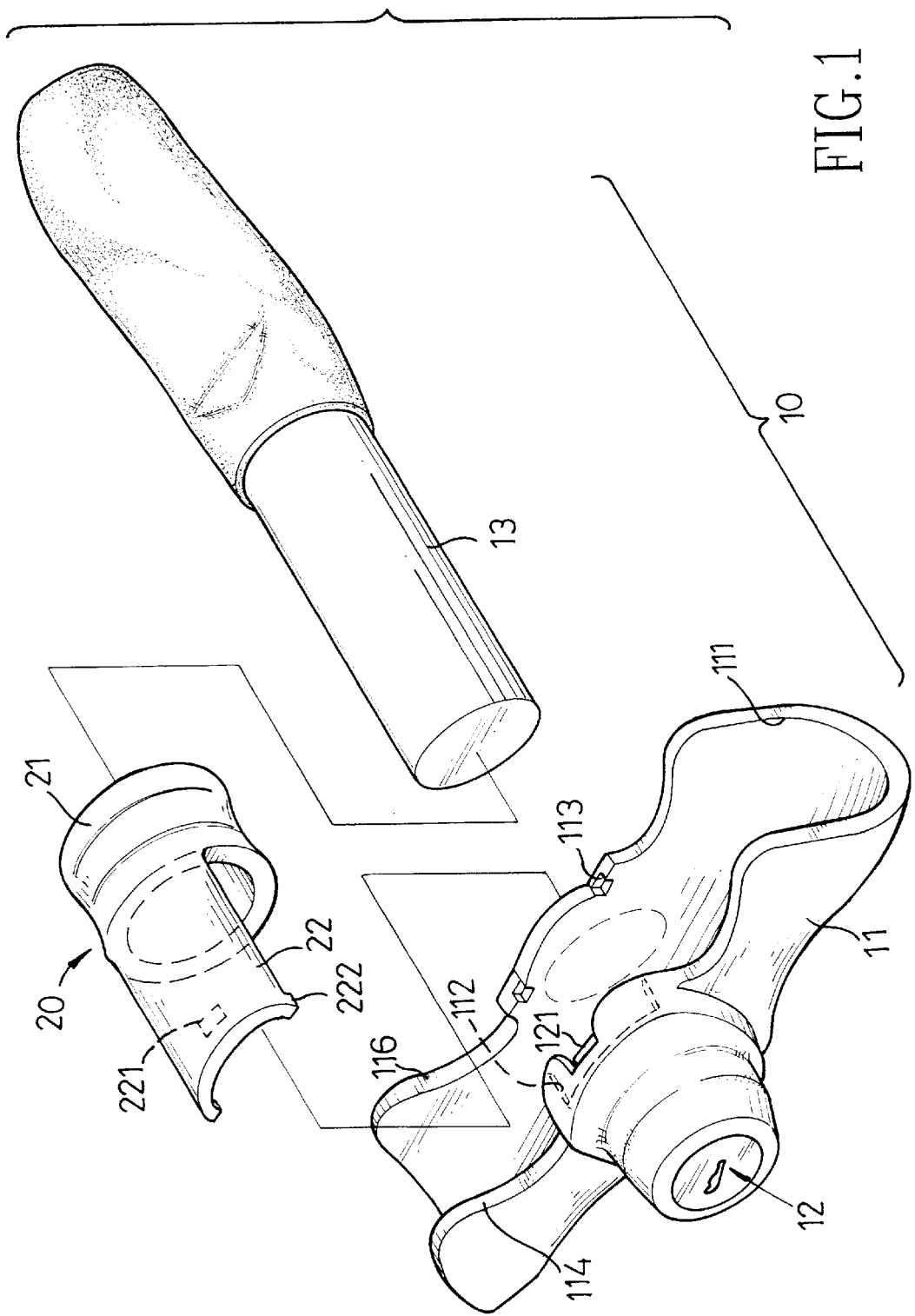
FIG. 1 is a perspective exploded view of a lock for a steering wheel of a vehicle in accordance with the present invention.

As shown in FIGS. 1 and 2, the present invention relates to a lock, which is used to secure a steering wheel of a vehicle, so as to prevent the steering wheel from rotation, such that it is not possible for the vehicle to be driven by any unauthorized person. The lock in accordance with the present invention comprises a body (10) and a catch (20).

The body (10) consists of a holding portion (11), a lock core (12) and a rod (13). The holding portion (11) is substantially U-shaped in end cross-section and has an upright first wall (114), an upright second wall (116), an arcuate bottom integrally extending between lower ends of the first and second walls (114, 116), and a recess (111) defined by the walls (114, 116) and the bottom corresponding to the rim shape of the steering wheel. The lock core (12) is provided in an outer face of the first wall (114) of the holding portion (11). The rod (13) is substantially perpendicular to the holding portion (11) and has a first end thereof secured on an outer face of the second wall (116) of the holding portion (11). A locking groove (112) is defined in an upper portion of the first wall (114), and a lock block (121) is extendable from the lock core (12) into the locking groove (112).

The catch (20) has a sleeve (21) slidingly mounted around the rod (13), and a retaining plate (22) extending from the sleeve (21) towards the locking groove (112) of the holding portion (11) when fitted thereto. A locking hole (221) is defined in the retaining plate (22) corresponding to the lock block (121). When a front end of the retaining plate (22) is inserted into the locking groove (112) of the holding portion (11), the lock block (121) is extended into the locking hole (221) to restrict movement of the retaining plate (22).

The retaining plate (22) further has two edges (222) formed at opposite sides of the front end thereof corresponding to two limiting steps (113) formed on an inner upper edge of the second wall (116) of the holding portion (11). When the retaining plate (22) is released from the locking groove (112), the catch (20) sliding back towards the rod (13) is limited by the edges (222) at the limiting steps (113).

FIG. 3 shows the rod (13) is enclosed in the sleeve (21) of the retaining catch (20).

Figure 4:
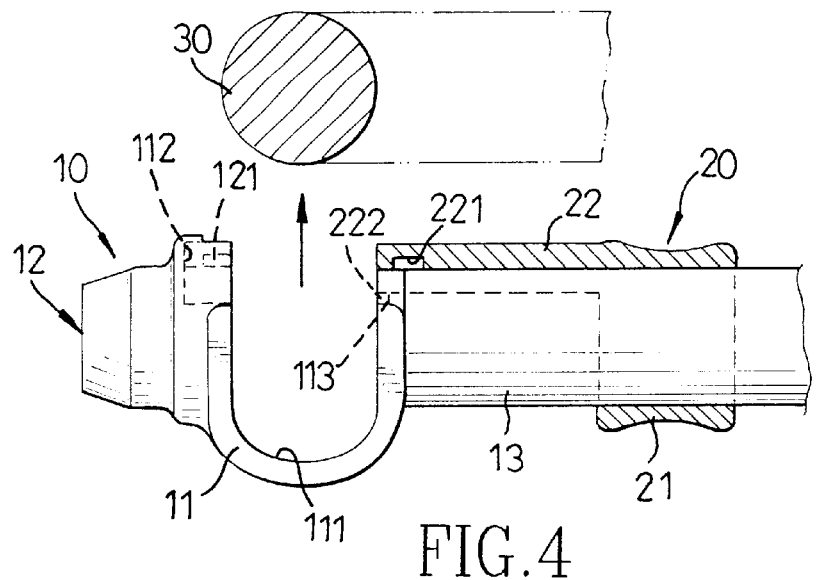
FIG. 4 is a first cross sectional view of a deployed status of the lock in accordance with the present invention.

FIG. 4 shows the recess (111) of the holding portion (11) is unobstructed by the catch (20), whereby a rim of a steering wheel (30) can be received in the recess (111).

Figure 5:
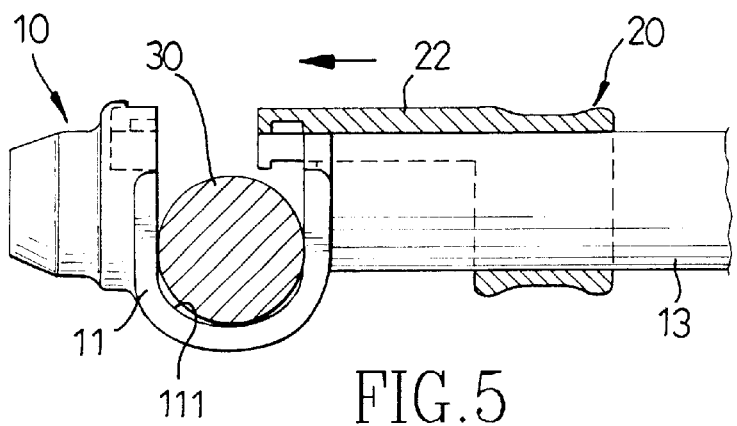
FIG. 5 is a second cross sectional view of the deployed status of the lock in accordance with the present invention.

As shown in FIG. 5, when the rim of the steering wheel (30) is fitted in the recess (111) of the holding portion (11), a user pushes the catch (20) towards the locking groove (112) of the holding portion (11).

Figure 6:
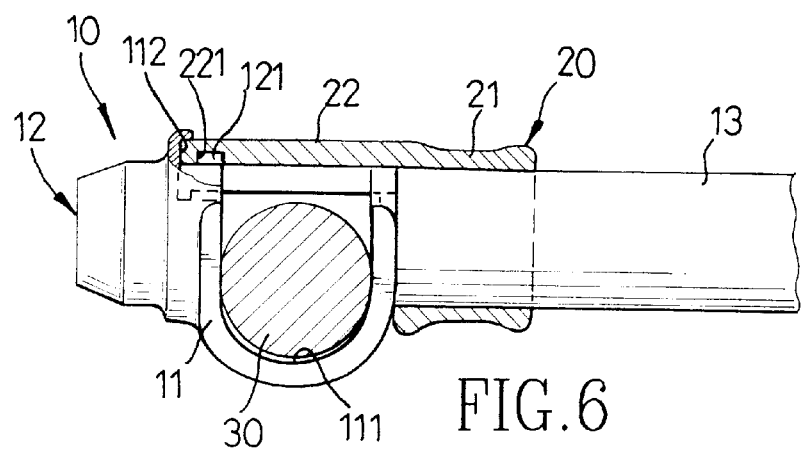
FIG. 6 is a third cross sectional view of the deployed status of the lock in accordance with the present invention.
Figure 7:
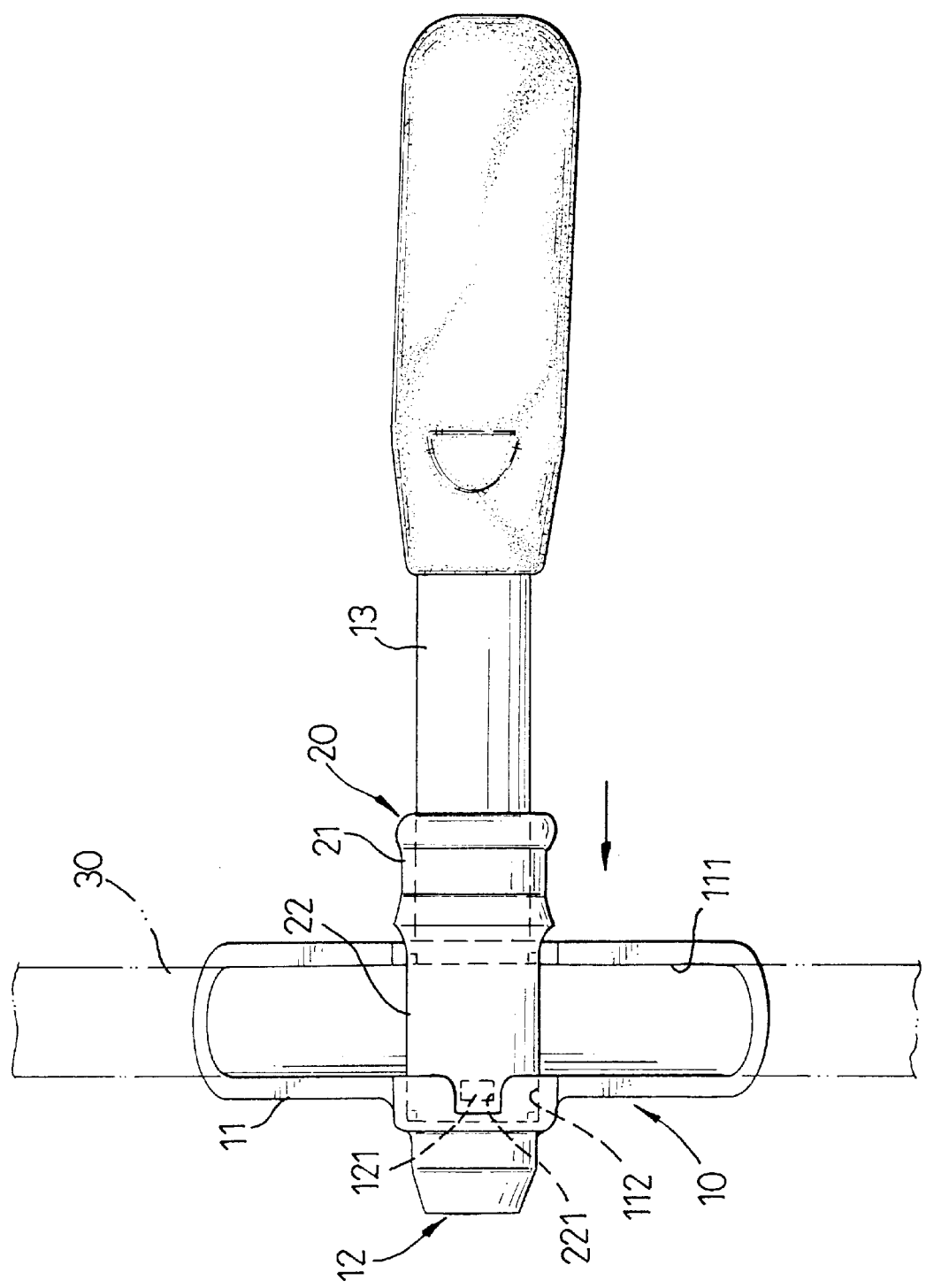
FIG. 7 is a side view of the lock in accordance with the present invention, showing the lock is locked with a steering wheel.

In FIGS. 6 and 7, when the front end of retaining plate (22) is inserted into the locking groove (112) of the holding portion (11), the lock block (121) extends into the lock hole (221) defined in the retaining plate (22), therefore the retaining plate (22) is locked in the locking groove (112), and the steering wheel (30) fitted in the recess (111) is restricted between the holding portion (11) and the retaining plate (22). A second end of the rod (13) is pressed against an interior part of the vehicle, thus the rotation of the steering wheel (30) is restricted.

Figure 8:
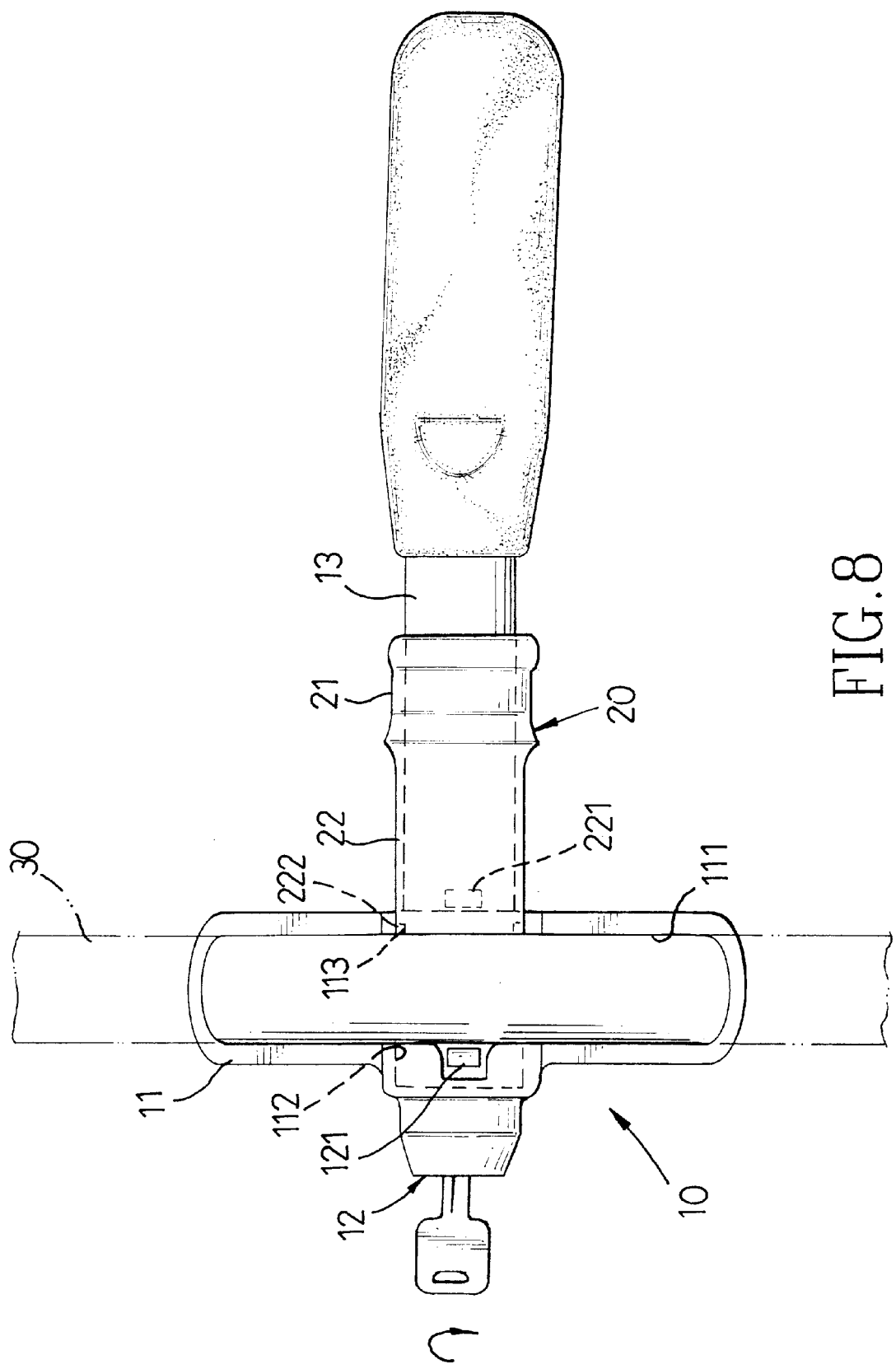
FIG. 8 is a side view of the lock in accordance with the present invention, showing the lock is unlocked with the steering wheel.

FIG. 8 shows that after a user unlocks the lock with a key, the retaining plate (22) of the catch (20) is released from the locking groove (112) and retracted to open the recess (111), so that the lock can be released from the steering wheel (30).

The lock of the present invention has following advantages:

1. the structure is simple and easy to be produced, so that the production cost is low;

2. since the front end of the retaining plate (22) is completely inserted into the locking groove (112) and locked therein by the lock block (121) extending into the lock hole (221) defined in the retaining plate (22), it is very difficult to pry open the lock.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A lock for a steering wheel of a vehicle, wherein in an unlocked mode the steering wheel of the vehicle can enter or exit the lock, and in a locked mode the steering wheel can be securely and non-rotatably retained in the lock, comprising:

a body (10) comprising of a holding portion (11), which has an upright first wall (114), an upright second wall (116), a bottom extending between the first and second walls (114, 116), and a recess (111) defined by the first and second walls (114, 116) and the bottom and adapted to receive therein a rim of the steering wheel, a lock core (12) fixed in an outer face of the first wall (114), and a rod (13) securely extending from an outer face of the second wall (116) and substantially perpendicular to the holding portion (11); and a catch (20) slidingly mounted around the rod (13) and having a retaining plate (22) extendingly and disengagably engaged with the lock core (12);

whereby when the steering wheel of the vehicle is received in the recess (111) and the retaining plate (22) engages with the lock core (12), the lock is in the locked mode, and whereby when the retaining plate (22) disengages with the lock core (12), the lock is in the unlocked mode.

2. The lock for the steering wheel of the vehicle as claimed in claim 1, wherein the holding portion (11) further has a locking groove (112) defined in the first wall (114) thereof corresponding to the retaining plate (22) of the catch (20).

3. The lock for the steering wheel of the vehicle as claimed in claim 2, wherein the retaining plate (22) of the catch (20) has a lock hole (221) defined therein, the lock core (12) has a lock block (121) extendable into the lock hole (221), when the retaining plate (22) is inserted into the locking groove (112), such that the retaining plate (22) of the catch (20) is retained in the locking groove (112) when the lock is in the locked mode.

4. The lock for the steering wheel of the vehicle as claimed in claim 1, wherein the second wall (116) of the holding portion (11) has two limiting steps (113) defined in an inner top edge thereof, the catch (20) includes two edges (222) corresponding to the limiting steps (113) of the holding portion (11), whereby travel of the catch (20) away from the lock core (12) is restricted by the edges (222) at the limiting steps (113).

5. The lock for the steering wheel of the vehicle as claimed in claim 1, wherein the rod has a length sufficient to abut an interior part of the vehicle when the lock is fitted to the steering wheel.

* * * * *